United States Patent
Lee et al.

(10) Patent No.: US 9,182,607 B2
(45) Date of Patent: Nov. 10, 2015

(54) DISPLAY APPARATUS

(75) Inventors: Jung-Hun Lee, Seoul (KR); Duckjong Suh, Seoul (KR); Seungbeom Park, Seoul (KR); Dong Hyun Song, Seoul (KR)

(73) Assignee: SAMSUNG DISPLAY CO., LTD. (KR)

(*) Notice: Subject to any disclaimer, the term of this patent is extended or adjusted under 35 U.S.C. 154(b) by 732 days.

(21) Appl. No.: 13/460,955

(22) Filed: May 1, 2012

(65) Prior Publication Data

US 2013/0027621 A1    Jan. 31, 2013

(30) Foreign Application Priority Data

Jul. 26, 2011 (KR) .................. 10-2011-0074166

(51) Int. Cl.
*G02F 1/136* (2006.01)
*G02F 1/13357* (2006.01)
*G02B 27/26* (2006.01)
*H04N 13/04* (2006.01)

(52) U.S. Cl.
CPC ............ *G02B 27/26* (2013.01); *H04N 13/0434* (2013.01)

(58) Field of Classification Search
CPC ............................. G02B 27/26; H04N 13/0434
See application file for complete search history.

(56) References Cited

U.S. PATENT DOCUMENTS

| | | | |
|---|---|---|---|
| 6,046,787 A * | 4/2000 | Nishiguchi | 349/129 |
| 7,515,340 B1 * | 4/2009 | Shiu et al. | 359/569 |
| 2005/0243100 A1 * | 11/2005 | Childers | 345/589 |
| 2008/0231926 A1 * | 9/2008 | Klug et al. | 359/23 |
| 2008/0278639 A1 * | 11/2008 | Hamagishi | 349/8 |
| 2008/0291126 A1 * | 11/2008 | Hamagishi | 345/55 |
| 2009/0235542 A1 * | 9/2009 | Miyazaki et al. | 33/286 |
| 2011/0181805 A1 * | 7/2011 | Nagami | 349/43 |
| 2011/0261299 A1 * | 10/2011 | Tai et al. | 349/98 |

FOREIGN PATENT DOCUMENTS

| | | |
|---|---|---|
| JP | 2000-305041 A | 11/2000 |
| JP | 2010-079216 A | 4/2010 |
| KR | 10-0623726 B1 | 9/2006 |
| KR | 10-0928265 B1 | 11/2009 |

* cited by examiner

*Primary Examiner* — Dave Czekaj
*Assistant Examiner* — Md Haque
(74) *Attorney, Agent, or Firm* — Cantor Colburn LLP

(57) ABSTRACT

A display apparatus includes a display panel including a plurality of pixels to display an image, a polarizing plate disposed on the display panel, and a retarder disposed opposite to the display panel, where the polarizing plate is interposed between the retarder and the display panel, the retarder includes first areas and second areas alternately arranged therein, and a direction of a slow axis of the retarder in the first areas is different from a direction of a slow axis of the retarder in the second areas.

16 Claims, 6 Drawing Sheets

DISPLAY APPARATUS

This application claims priority to Korean Patent Application No. 10-2011-0074166, filed on Jul. 26, 2011, and all the benefits accruing therefrom under U.S.C. §119, the content of which in its entirety is herein incorporated by reference.

BACKGROUND OF THE INVENTION

1. Field of disclosure

The invention relates to a display apparatus. More particularly, the present invention relates to a display apparatus capable of improving display characteristics of a three-dimensional ("3D") image.

2. Description of the Related Art

A 3D image display apparatus generally provides a left-eye image and a right-eye image to a left eye and a right eye of an observer, which have a binocular disparity. The observer watches the left and right images provided from the 3D image display apparatus through the two eyes thereof, thereby perceiving a 3D image. In general, the 3D image display apparatus is classified into a glass type 3D image display apparatus and a non-glass type 3D image display apparatus. A glass type 3D image display apparatus employing a patterned retarder to display the 3D image recently has been developed.

However, a cross-talk phenomenon may occur in the 3D image display apparatus employing the patterned retarder. As a result, a portion of the left-eye image for the left eye may be provided to the right eye or a portion of the right-eye image for the right eye is provided to the left eye.

BRIEF SUMMARY OF THE INVENTION

Exemplary embodiments of the invention provide a display apparatus in which the cross-talk phenomenon is effectively prevented or substantially reduced.

According to an exemplary embodiment, a display apparatus includes a display panel including a plurality of pixels to display an image, a polarizing plate disposed on the display panel and a retarder disposed opposite to the display panel, the polarizing plate is interposed between the retarder and the display panel, the retarder includes first areas and second areas alternately arranged therein, and a direction of a slow axis of the retarder in the first areas is different from a direction of a slow axis of the retarder in the second areas.

In exemplary embodiments, the cross-talk phenomenon is effectively prevented or substantially reduced when a three-dimensional ("3D") image is displayed, and display characteristics of the display apparatus is thereby substantially improved.

BRIEF DESCRIPTION OF THE DRAWINGS

The above and other features and aspects of the invention will become readily apparent by reference to the following detailed description when considered in conjunction with the accompanying drawings, in which.

DETAILED DESCRIPTION OF THE INVENTION

Figure 1:
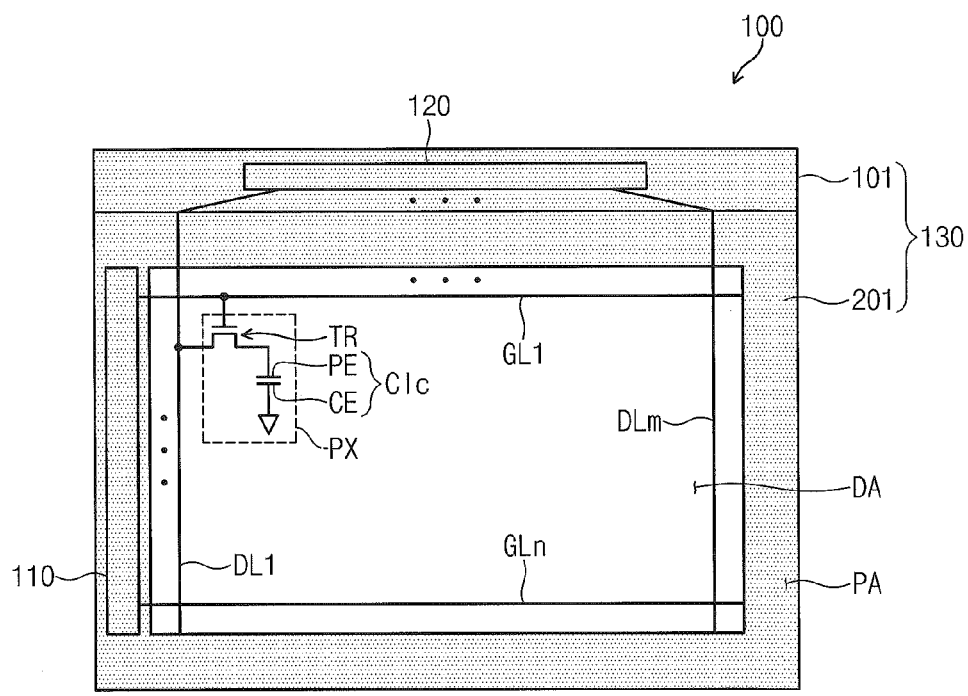
FIG. 1 is a block diagram showing an exemplary embodiment of a display apparatus according to the invention.

The invention now will be described more fully hereinafter with reference to the accompanying drawings, in which various embodiments are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the invention will be explained in detail with reference to the accompanying drawings.

FIG. 1 is a block diagram showing an exemplary embodiment of a display apparatus according to the invention.

Referring to FIG. 1, a display apparatus 100 includes a display panel 130, a gate driver 110 and a data driver 120.

The display panel 130 includes a first substrate 101, a second substrate 201 disposed opposite to, e.g., facing, the first substrate 101, and a liquid crystal layer (shown in FIG. 2) interposed between the first and second substrates 101 and 201.

The first substrate 101 includes a plurality of pixels PX to display an image. The first substrate 101 includes a display area DA, in which the image is displayed, and a peripheral area PA, in which the image is not displayed. In such an embodiment, the pixels PX are arranged in the display area DA to display the image.

The first substrate 101 includes a plurality of gate lines GL1 to GLn extending in a first direction D1, a plurality of data lines DL1 to DLm extending in a second direction D2 crossing the first direction D1, a plurality of thin film transistors TR and a plurality of pixel electrodes PE. In the illustrated exemplary embodiment, each of "n" and "m" is a natural number greater than or equal to 1. Each of the pixels PX may include a corresponding gate line of the gate lines GL1 to GLn, a corresponding data line of the data lines DL1 to DLm, a corresponding thin film transistor of the thin film transistors TR, and a corresponding pixel electrode of the pixel electrodes PE.

In the illustrated exemplary embodiment, the structure and function of each of the pixels PX are substantially identical to each other. In FIG. 1, only one pixel has been shown for convenience of description.

In an exemplary embodiment, the gate lines GL1 to GLn, the data lines DL1 to DLm, the thin film transistors TR and the pixel electrodes PE may be provided in the display area DA through a thin film process. In an exemplary embodiment, the pixels PX may be arranged substantially in a matrix form on the first substrate 101.

Each of the thin film transistors TR includes a gate electrode connected to a corresponding gate line, a source electrode connected to a corresponding data line, and a drain electrode connected to a corresponding pixel electrode. Each of the pixel electrodes PE is disposed facing a corresponding common electrode CE disposed on the second substrate 201, and a liquid crystal layer is disposed therebetween to form a liquid crystal capacitor Clc.

The gate driver 110 is connected to the gate lines GL1 to GLn to sequentially apply a gate signal to the gate lines GL1 to GLn. In an exemplary embodiment, the gate driver 110 may be provided through the thin film process on a portion of the first substrate 101 corresponding to the peripheral area PA adjacent to a left or right side of the display area DA. In an exemplary embodiment, as shown in FIG. 1, the gate driver 110 is disposed in a portion of the peripheral area PA adjacent to the left side of the display area DA, but the invention is not be limited thereto. In an alternative exemplary embodiment, the gate driver 110 may be disposed in a portion of the peripheral area PA adjacent to the right side of the display area DA or in a portion of the peripheral area adjacent to both the left and right sides of the display area DA.

In an exemplary embodiment, the data driver 120 may be provided as a chip disposed in a portion of the first substrate 101 corresponding to the peripheral area PA adjacent to an upper side of the display area DA. In such an embodiment, the chip is electrically connected to the data lines DL1 to DLm to apply data signals to the data lines DL1 to DLm. In an exemplary embodiment, the data driver 120 may be provided outside the first and second substrates 101 and 201.

In an exemplary embodiment, although not shown in FIG. 1, a timing controller may be provided outside the first and second substrates 101 and 201. In such an embodiment, the timing controller may convert a data format of an image signal into a data format corresponding to an interface between the data driver 120 and the timing controller, and output the converted image signal to the data driver 120. In an exemplary embodiment, the timing controller applies a data control signal to the data driver 120 and applies a gate control signal to the gate driver 110.

The gate driver 110 sequentially applies the gate signals to the gate lines GL1 to GLn in response to the gate control signal to sequentially scan the gate lines GL1 to GLn.

In an exemplary embodiment, the data driver 120 receives gamma voltages provided from a gamma voltage generator (not shown) and generates a plurality of gray-scale voltages. The data driver 120 selects gray-scale voltages, which correspond to the image signal, from the generated gray-scale voltages in response to the data control signal from the timing controller, and respectively applies the selected gray-scale voltages to the data lines DL1 to DLm as the data signals.

The display apparatus 100 may further include a glasses unit 160 to allow an observer to perceive a three-dimensional ("3D") image when the display apparatus 100 displays the 3D image. The glasses unit 160 includes a right eye glass 161 and a left eye glass 162. The glasses unit 160 will be described in detail later.

Figure 2:
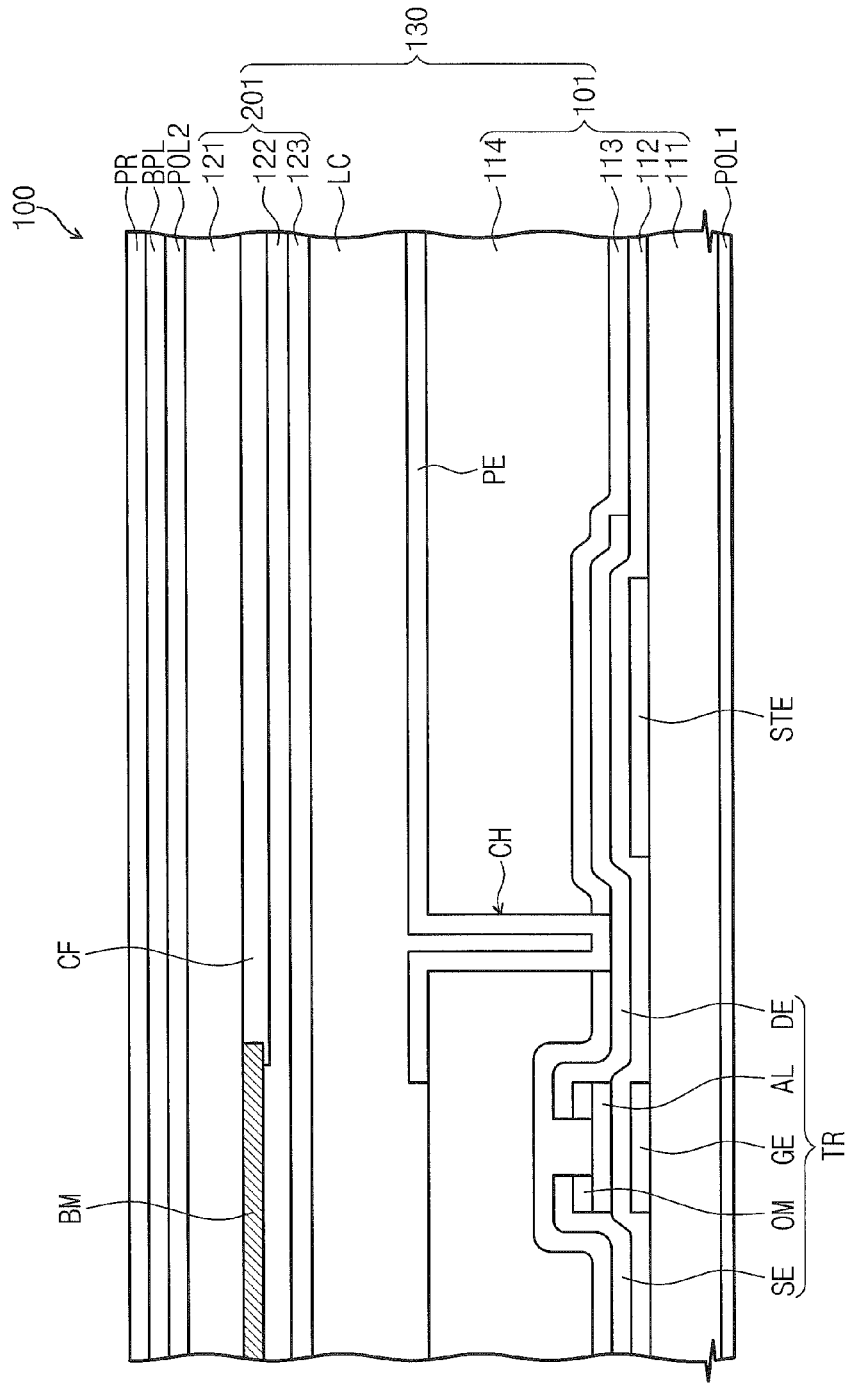
FIG. 2 is a cross-sectional view of the display apparatus shown in FIG. 1.

FIG. 2 is a cross-sectional view of the display apparatus shown in FIG. 1. FIG. 2 shows a cross-sectional view of a portion of the display apparatus corresponding to one pixel.

Referring to FIG. 2, the display apparatus 100 includes the first substrate 101, the second substrate 201 disposed opposite to, e.g., facing, the first substrate 101, and the liquid crystal layer LC interposed between the first substrate 101 and the second substrate 201.

The first substrate 101 includes a first base substrate 111, and a gate electrode GE is disposed on the first base substrate 111. The first base substrate 111 may include glass or plastic, such as polyethylene terephthalate ("PET"), fiber reinforced plastic ("FRP") and polyethylene naphthalate ("PEN"), for example.

The gate electrode GE is covered by a first insulating layer 112. The first insulating layer 112 may include an oxide material, a nitride material or a transparent insulating material, e.g., silicon nitride (SiNx) and silicon oxide (SiOx).

An active layer AL and an ohmic contact layer OM are disposed on the first insulating layer 112 in a portion corresponding to the gate electrode GE. In an exemplary embodiment, a source electrode SE and a drain electrode DE are disposed overlapping the gate electrode GE, and the first insulating layer 112, the active layer AL and the ohmic contact layer OM are disposed between the gate electrode GE and the source and drain electrodes SE and DE. The source electrode SE and the drain electrode DE are spaced apart from each other with a predetermined distance.

The thin film transistor TR includes the gate electrode GE, the source electrode SE, the drain electrode DE, the active layer AL and the ohmic contact layer OM. The thin film transistor TR may be covered by a second insulating layer 113. The second insulating layer 113 may include an oxide material, a nitride material or a transparent insulating material, e.g., silicon nitride (SiNx) and silicon oxide (SiOx).

A third insulating layer 114 may be provided on the second insulating layer 113. The third insulating layer 114 may include an organic material, and an upper surface of the third insulating layer 114 is planarized such that a step-difference thereunder is compensated.

A contact hole CH is formed through the second insulating layer 113 and the third insulating layer 114 such that at least a portion of the drain electrode DE of the thin film transistor TR is exposed through the contact hold CH. The pixel electrode PE is disposed on the third insulating layer 114 and connected to the drain electrode DE through the contact hole CH.

The first substrate 101 may further include a storage electrode STE disposed between the first base substrate 111 and the first insulating layer 112. The storage electrode STE is disposed facing the drain electrode DE such that a storage capacitor is thereby formed with the first insulating layer 112 as a dielectric substance.

The second substrate 201 includes a second base substrate 121, a common electrode 123, a black matrix BM and a color filter CF.

The second base substrate 121 may include glass or plastic, such as PET, FRP and PEN, for example.

The black matrix BM includes a light blocking material and is disposed on the second base substrate 121 substantially in a matrix form to prevent light leakage in a non-display area. The non-display area includes an area between two adjacent pixel electrodes on the first base substrate 111. The black matrix BM may be an inorganic material, e.g., chromium oxide (CrOx) and chromium, or an organic material, e.g., a photosensitive agent with which a black coloring matter is mixed.

The color filter CF may be one of a red color filter, a green color filter, a blue color filter, a yellow color filter and a white color filter. The red, green, blue and yellow color pixels include red, green, blue and yellow color filters, respectively, to selectively transmit light having a specific wavelength corresponding to a specific color or light having a wavelength outside a specific wavelength range. Thus, a color to be displayed by a sub-pixel is determined by the color of a color filter CF corresponding to the sub-pixel in the display apparatus 100. In one exemplary embodiment, for example, when the red color filter is included in a sub-pixel, the sub-pixel including the red color filter becomes a red sub-pixel. In an exemplary embodiment, an end portion of the color filter CF may overlap the black matrix BM.

An overcoating layer 122 may be disposed on the color filter CF and the black matrix BM to compensate for the step-difference thereunder. In an exemplary embodiment, the overcoating layer 122 has a predetermined thickness to compensate the step-difference between the black matrix BM and the color filter CF.

In an exemplary embodiment, as shown in FIG. 2, the color filter CF is disposed on the second substrate 201, but not being limited thereto. In an alternative exemplary embodiment, the color filter CF may be disposed on the first substrate 101.

The common electrode 123 is disposed on the overcoating layer 122. The common electrode 123 may include a transparent conductive material, such as indium tin oxide ("ITO") or indium zinc oxide ("IZO"), to transmit light. In an exemplary embodiment, as shown in FIG. 2, the common electrode 123 is disposed on the second substrate 201, but not being limited thereto. In an alternative exemplary embodiment, the common electrode 123 may be disposed on the first substrate 101.

The liquid crystal layer LC includes liquid crystals to control the transmission of the light incident thereto with an electric field generated between the pixel electrode PE and the common electrode 123. The liquid crystals may be a twisted nematic liquid crystal, a vertically aligned liquid crystal, a horizontally aligned liquid crystal or a cholesteric liquid crystal, for example.

A first polarizing plate POL1 is disposed under the first substrate 101 facing the liquid crystal layer LC. The first polarizing plate POL1 transmits light polarized in a predetermined direction and absorbs light polarized in a direction vertical to the predetermined direction. In an exemplary embodiment, a second polarizing plate POL2 is disposed on the second substrate 201 facing the liquid crystal layer LC. The second polarizing plate POL2 transmits light polarized in a predetermined direction and absorbs light polarized in a direction vertical to the predetermined direction. In an exemplary embodiment, although not shown in FIG. 2, a transmission axis of the first polarizing plate POL1 is substantially parallel to, substantially vertical to, or inclined to a transmission axis of the second polarizing plate POL2, for example.

A barrier pattern layer BPL may be disposed on the second polarizing plate POL2 facing the second base substrate 121. The barrier pattern layer BPL includes a barrier pattern (not shown in FIG. 2) disposed between two adjacent pixels to effectively prevent or substantially reduce the cross-talk phenomenon.

A pattern retarder PR is disposed on the barrier pattern layer BPL facing the second base substrate 121, and the barrier pattern layer BPL is interposed between the pattern retarder PR and the second base substrate 121.

In FIGS. 1 and 2, the illustrated exemplary embodiment of the display apparatus is a liquid crystal display, but the invention is not limited thereto.

Figure 3:
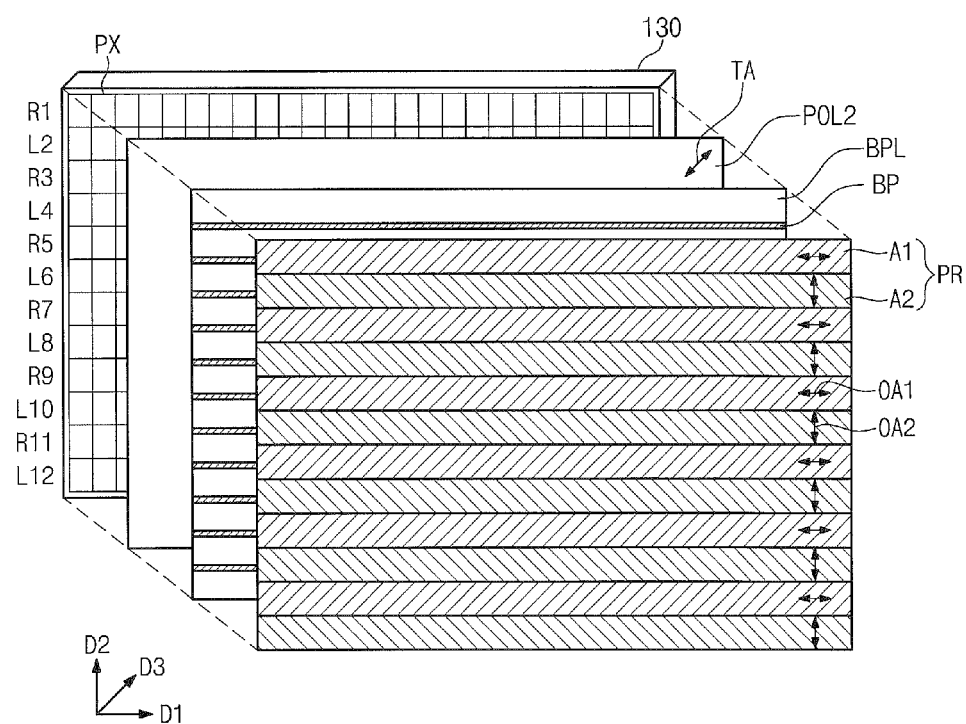
FIG. 3 is an exploded perspective view of the display apparatus shown in FIG. 1.

FIG. 3 is an exploded perspective view of the display apparatus shown in FIG. 1.

FIG. 3 shows a positional relationship between the display panel 130, the second polarizing plate POL2, the barrier pattern layer BPL and the retarder PR in the area corresponding to the display area DA shown in FIG. 1.

Referring to FIG. 3, the pixels PX are arranged on the display panel 130 substantially in a matrix form of 12 rows by 24 columns. When the observer wears the glasses unit 160 (shown in FIG. 1), the light from pixels arranged in odd-numbered rows R1, R3, R5, R7, R9 and R11 among the pixels PX is provided to the right eye of the observer, and the light from pixels arranged in even-numbered rows L2, L4, L6, L8, L10 and L12 among the pixels PX is provided to the left eye of the observer.

In an exemplary embodiment, the second polarizing plate POL2 disposed on the display panel 130 has a transmission axis TA substantially parallel to a third direction D3 between the first direction D1 and the second direction D2. In such an embodiment, the second polarizing plate POL2 transmits the light polarized in the direction substantially parallel to the third direction D3 and absorbs the light polarized in the direction vertical to the third direction D3.

The retarder PR is disposed facing the display panel 130, and the second polarizing plate POL2 is disposed between the retarder PR and the display panel 130. The retarder PR includes a first optical area A1 corresponding to the pixels arranged in the odd-numbered rows R1 to R11 and a second optical area A2 corresponding to the pixels arranged in the even-numbered rows L2 to L12. The retarder PR has a first slow axis OA1 substantially parallel to the first direction D1 in the first optical area A1 and a second slow axis OA2 substantially parallel to the second direction D2 in the second optical area A2.

In an exemplary embodiment, the retarder PR may include an anisotropic material or other materials in which a birefringence occurs.

Referring to FIG. 3, the light linearly polarized by the second polarizing plate POL2 transmits through the retarder PR, and then is left-circularly polarized or right-circularly polarized. In an exemplary embodiment, the light generated from the pixels arranged in the odd-numbered rows R1 to R11 transmits through the second polarizing plate POL2 and the first optical area A1 of the retarder PR such that the transmitted light is right-circularly polarized, and the light generated from the pixels arranged in the even-numbered rows L2 to L12 transmits through the second polarizing plate POL2 and the second optical area A2 of the retarder PR such that the transmitted light is left-circularly polarized. In an alternative exemplary embodiment, the light generated from the pixels arranged in the odd-numbered rows R1 to R11 may transmit through the second polarizing plate POL2 and the first optical area A1 of the retarder PR such that the transmitted light is left-circularly polarized, and the light generated from the pixels arranged in the even-numbered rows L2 to L12 may transmit through the second polarizing plate POL2 and the second optical area A2 of the retarder PR such that the transmitted light is right-circularly polarized. In an exemplary embodiment, the retarder PR may be a quarter-wave plate having different slow axes from each other in the first optical area A1 and the second optical area A2 to change the linearly polarized light to the circularly polarized light.

Referring to FIGS. 1 and 3, the glasses unit 160 includes the right eye glass 161 for the right eye of the observer and the left eye glass 162 for the left eye of the observer. The right eye glass 161 may transmit the light passed through the first optical area A1 of the retarder PR and block the light passed through the second optical area A2 of the retarder PR. The left eye glass 162 may block the light passed through the first optical area A1 of the retarder PR and transmit the light passed through the second optical area A2 of the retarder PR. In such an embodiment, the right eye glass 161 and the left eye glass 162 may include a retarder and a polarizing plate.

Referring again to FIG. 3, the display apparatus 100 may further include a barrier pattern layer BPL disposed between the second polarizing plate POL2 and the retarder PR. The barrier pattern layer BPL includes the barrier patterns BP disposed between the pixels arranged in two adjacent rows to effectively prevent or substantially reduced the cross-talk phenomenon. In such an embodiment, the barrier patterns BP may prevent the light from the pixels arranged in the odd-numbered rows R1 to R11 from being provided to the left eye of the observer and prevent the light from the pixels arranged in the even-numbered rows L2 to L12 from being provided to the right eye of the observer.

Figure 4:
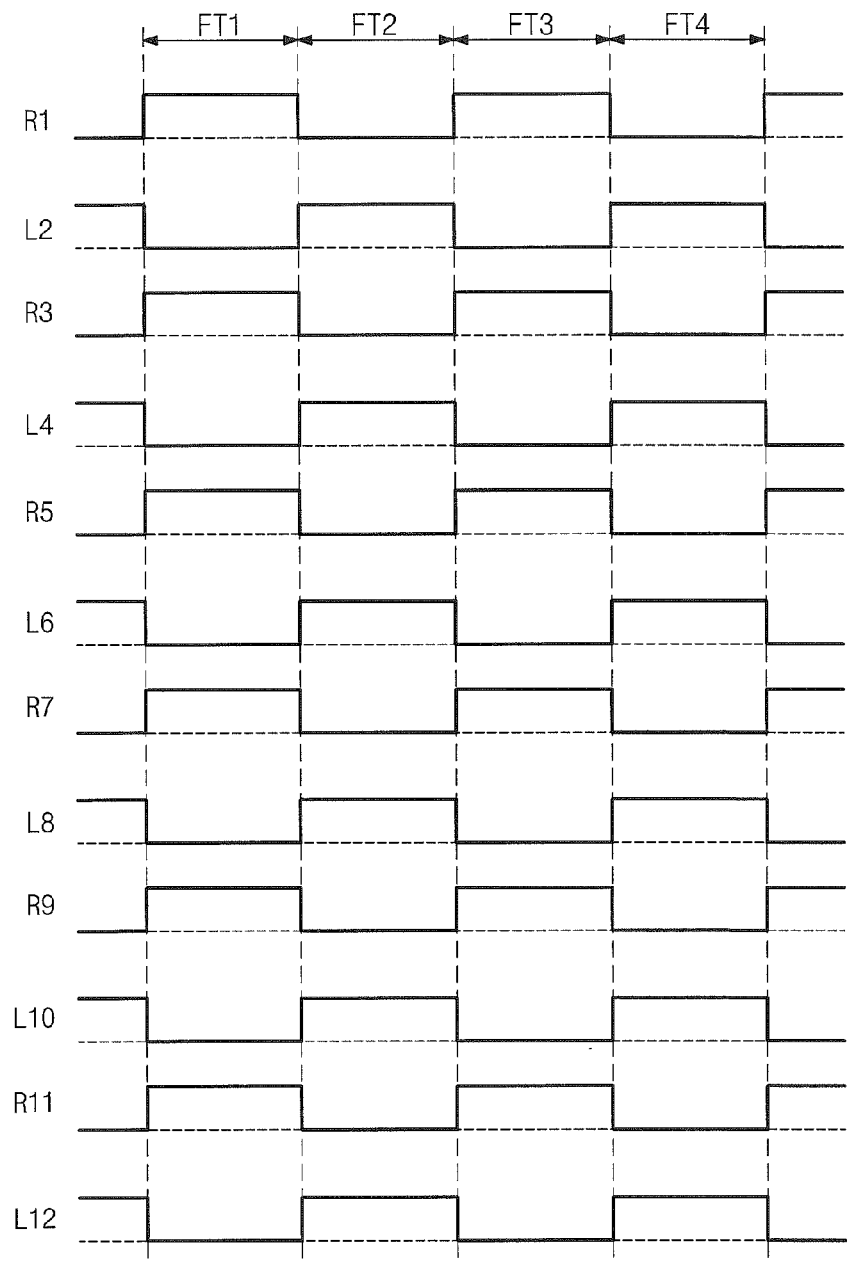
FIG. 4 is a signal timing diagram showing an exemplary embodiment of a driving timing of pixels shown in FIG. 3 according to the invention.

FIG. 4 is a signal timing diagram showing an exemplary embodiment of a driving timing of pixels shown in FIG. 3 according to the invention. FIG. 4 shows driving timings of the pixels arranged in the first to twelfth rows R1 to R11 and L2 to L12 shown in FIG. 3.

Referring to FIG. 4, the display apparatus 100 is driven on a frame-by-frame basis. During successively arranged four frames, e.g., first to fourth frames FT1 to FT4, the pixels arranged in the odd-numbered rows R1 to R11 are driven in the first frame FT1 and the third frame FT3, and the pixels arranged in the even-numbered rows L2 to L12 are driven in the second frame FT2 and the fourth frame FT4. In an exemplary embodiment, when the pixels are driven, the pixels display a desired gray scale or color.

In an exemplary embodiment, the pixels arranged in the odd-numbered rows R1 to R11 display predetermined gray scales corresponding to data voltages, which are applied through corresponding data lines, in response to a gate-on voltage applied to corresponding gate lines during the first and third frames FT1 and FT3. In the first and third frames FT1 and FT3, the pixels arranged in the even-numbered rows L2 to L12 display a black gray scale in response to a gate-off voltage applied to the corresponding gate lines. Although the gate-on voltage is applied to the corresponding gate lines, the pixels arranged in the even-numbered rows L2 to L12 receive the data voltages corresponding to the black gray scale through the corresponding data lines such that the pixels arranged in the even-numbered rows L2 to L12 display the black gray scale.

In such an embodiment, the pixels arranged in the even-numbered rows L2 to L12 display predetermined gray scales corresponding to data voltages, which are applied through corresponding data lines, in response to the gate-on voltage applied to the corresponding gate lines during the second and fourth frames FT2 and FT4. In the second and fourth frames FT2 and FT4, the pixels arranged in the odd-numbered rows R1 to R11 display the black gray scale in response to the gate-off voltage applied to the corresponding gate lines. Although the gate-on voltage is applied to the corresponding gate lines, the pixels arranged in the odd-numbered rows R1 to R11 receive the data voltages corresponding to the black gray scale through the corresponding data lines such that the pixels arranged in the odd-numbered rows R1 to R11 display the black gray scale. In FIG. 4, each of the first to fourth frames FT1 to FT4 may have a time period equal to or shorter than about 1/120 second, 1/240 second, or 1/480 second.

As described in FIG. 4, when the pixels for the right eye of the observer are and the pixels for the left eye of the observer are alternatively driven on a frame-by-frame basis, the cross-talk phenomenon is effectively prevented or substantially reduced.

Figure 5:
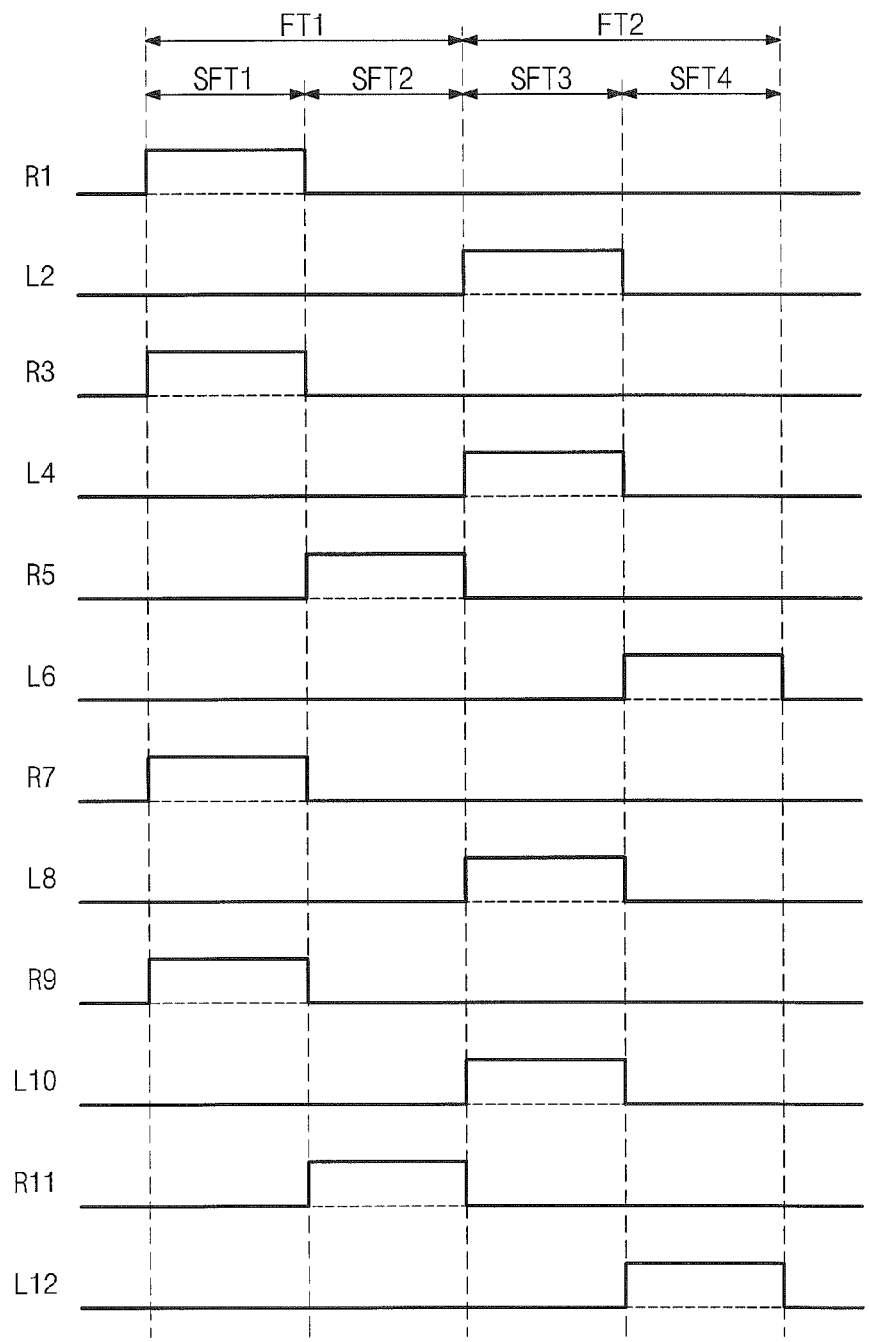
FIG. 5 is a signal timing diagram showing an alternative exemplary embodiment of a driving timing of pixels shown in FIG. 3 according to the present invention.

FIG. 5 is a signal timing diagram showing an alternative exemplary embodiment of a driving timing of pixels shown in FIG. 3 according to the invention. FIG. 5 shows driving timings of the pixels arranged in the first to twelfth rows R1 to R11 and L2 to L12 shown in FIG. 3.

As shown in FIG. 5, a part of the pixels arranged in the odd-numbered rows R1 to R11 is driven in a first sub-frame SFT1 of a first frame FT1 and a remaining part of the pixels arranged in the odd-numbered rows R1 to R11 is driven in a second sub-frame SFT2 of the first frame FT1. A part of the pixels arranged in the even-numbered rows L2 to L12 is driven in a first sub-frame SFT2 of a second frame FT2 and a remaining part of the pixels arranged in the even-numbered rows L2 to L12 is driven in a second sub-frame SFT4 of the second frame FT2. In an exemplary embodiment, when the pixels are driven, the pixels display a desired gray scale or color.

In an exemplary embodiment, the pixels arranged in a (6i+1)-th row and a (6i+3)-th row ("i" is equal to or larger than zero) among the pixels PX are driven in the first sub-frame SFT1 of the first frame FT1, the pixels arranged in a (6i+5)-th row among the pixels PX are driven in the second sub-frame SFT2 of the first frame FT1, the pixels arranged in a (6i+2)-th row and a (6i+4)-th row among the pixels PX are driven in the first sub-frame SFT3 of the second frame FT2, and the pixels arranged in a (6i+6)-th row among the pixels PX are driven in the second sub-frame SFT4 of the second frame FT2.

In such an embodiment, during the first sub-frame SFT1 of the first frame FT1, the pixels arranged in the first, third, seventh and ninth rows R1, R3, R7 and R9 of the odd-numbered rows R1 to R11 display a predetermined gray scale corresponding to the data voltage applied to the corresponding data line in response to the gate-on voltage applied to the corresponding gate line. During the first sub-frame SFT1 of the first frame FT1, the pixels arranged in other rows except for the first, third, seventh and ninth rows R1, R3, R7 and R9 display a black gray scale in response to the gate-off voltage applied to the corresponding gate line. Although the gate-on voltage is applied to the corresponding gate line, the pixels arranged in the other rows except for the first, third, seventh and ninth rows R1, R3, R7 and R9 display the black gray scale corresponding to the data voltage applied to the corresponding data line.

During the second sub-frame SFT2 of the first frame FT1, the pixels arranged in the fifth and eleventh rows R5 and R11 of the odd-numbered rows R1 to R11 display a predetermined gray scale corresponding to the data voltage applied to the corresponding data line in response to the gate-on voltage applied to the corresponding gate line. During the second sub-frame SFT2 of the first frame FT1, the pixels arranged in other rows except for the fifth and eleventh rows R5 and R11 display a black gray scale in response to the gate-off voltage applied to the corresponding gate line. Although the gate-on voltage is applied to the corresponding gate line, the pixels arranged in the other rows except for the fifth and eleventh rows R5 and R11 display the black gray scale corresponding to the data voltage applied to the corresponding data line.

During the first sub-frame SFT3 of the second frame FT2, the pixels arranged in the second, fourth, eighth and tenth rows L2, L4, L8 and L10 of the even-numbered rows L2 to L12 display a predetermined gray scale corresponding to the data voltage applied to the corresponding data line in response to the gate-on voltage applied to the corresponding gate line. During the first sub-frame SFT3 of the second frame FT2, the pixels arranged in other rows except for the second, fourth, eighth and tenth rows L2, L4, L8 and L10 display a black gray scale in response to the gate-off voltage applied to the corresponding gate line. Although the gate-on voltage is applied to the corresponding gate line, the pixels arranged in the other rows except for the second, fourth, eighth and tenth rows L2, L4, L8 and L10 display the black gray scale corresponding to the data voltage applied to the corresponding data line.

During the second sub-frame SFT4 of the second frame FT2, the pixels arranged in the sixth and twelfth rows L6 and L12 of the even-numbered rows L2 to L12 display a predetermined gray scale corresponding to the data voltage applied to the corresponding data line in response to the gate-on voltage applied to the corresponding gate line. During the second sub-frame SFT4 of the second frame FT2, the pixels arranged in other rows except for the sixth and twelfth rows L6 and L12 display a black gray scale in response to the gate-off voltage applied to the corresponding gate line. Although the gate-on voltage is applied to the corresponding gate line, the pixels arranged in the other rows except for the sixth and twelfth rows L6 and L12 display the black gray scale corresponding to the data voltage applied to the corresponding data line.

In FIG. 5, each of the first and frames FT1 and FT2 may have a time period equal to or shorter than about $1/120$ second, $1/240$ second, or $1/480$ second. In such an embodiment, each of the first and second sub-frames SFT1 to SFT4 may have a time period equal to or shorter than about $1/240$ second or about $1/480$ second.

As described in FIG. 5, the pixels for the right eye of the observer and the pixels for the left eye of the observer are alternately driven on a frame-by-frame basis, and the pixels for the right eye and the pixel for the left eye are divided into at least two sub-group to be alternately driven on a sub-frame-by-sub-frame basis such that the cross-talk phenomenon is effectively prevented or substantially reduced.

Figure 6:
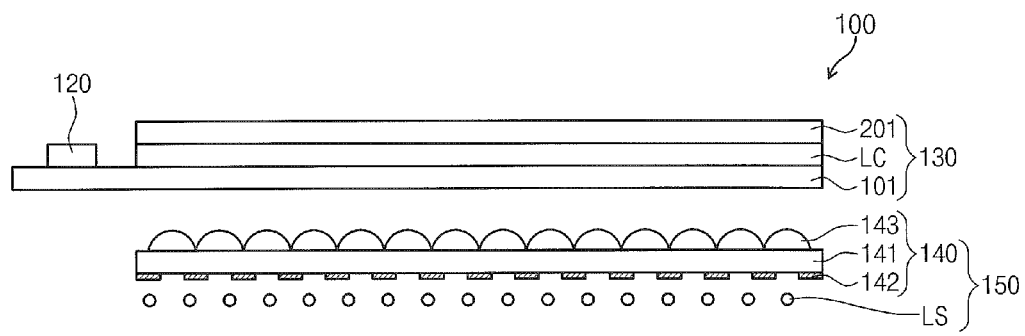
FIG. 6 is a cross-sectional view of an exemplary embodiment of the display apparatus including a backlight unit shown in FIG. 1.
Figure 7:
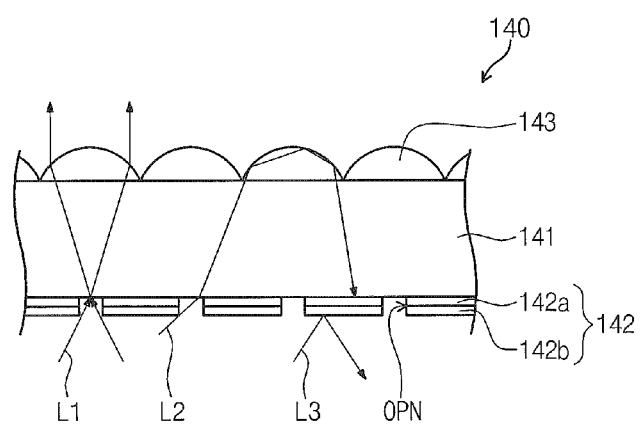
FIG. 7 is an enlarged cross-sectional view of an exemplary embodiment of an optical film shown in FIG. 6.

FIG. 6 is a cross-sectional view of an exemplary embodiment of the display apparatus including a backlight unit shown in FIG. 1, and FIG. 7 is an enlarged cross-sectional view of an exemplary embodiment of an optical film shown in FIG. 6.

Referring to FIG. 6, the display apparatus 100 includes a display panel 130, a data driver 120 disposed on the display panel 130, and a backlight unit 150 that provides light to the display panel 130.

The display panel 130 includes a first substrate 101, a second substrate 201 disposed opposite to, e.g., facing, the first substrate 101, and a liquid crystal layer LC disposed between the first substrate 101 and the second substrate 201.

The backlight unit 150 includes a light source LS that emits the light and an optical film 140 disposed between the light source LS and the display panel 130 to control an optical path of the light.

The light source LS may include a light emitting diode or a cold cathode fluorescent lamp to emit white light or colored light.

The optical film 140 includes a base film 141, a plurality of micro-lenses 143 disposed on the base film 141 and an optical pattern layer 142 disposed under the base film 141.

The base film 141 may include a transparent material to transmit the light incident thereto, such as a polymer, for example. The micro-lenses 143 may include a glass material or a polymer-based material, e.g., polymethly methacrylate. The micro-lenses 143 condenses the light traveling through the base film 141 toward the display panel 130 such that the light provided to the display panel is substantially parallel to a normal line of a surface of the base film 141.

The optical pattern layer 142 includes a material that reflects or absorbs the light incident thereto and allows the light to be substantially parallel to the normal line of the surface of the base film 141 with the micro-lenses 143.

Referring to FIG. 7, the optical pattern layer 142 includes a light absorbing layer 142a in contact with the base film 141 and a light reflecting layer 142b disposed on the light absorbing layer 142a. The light absorbing layer 142a may include a material that absorbs the incident light, and the light absorbing layer 142a may be coated on the base film 141 in a thin film shape. The light reflecting layer 142b may include a material that reflects the incident light, and the light reflecting layer 142b may be coated on the light absorbing layer 142a in a thin film shape.

A plurality of openings OPN, corresponding to focal positions of the micro-lenses 142, respectively, is formed through the optical pattern layer 142. In such an embodiment, first light L1 incident to one of the micro-lenses 142 after passing through one of the openings OPN corresponding to the one micro-lens travels through a focal point of the corresponding micro-lens, and the first light L1 thereby travels in a direction substantially parallel to the normal line of the surface of the base film 141 after passing through the corresponding micro-lens. Second light L2 incident to one of the micro-lenses 142 after passing through one of the openings OPN not corresponding to the one micro-lens is totally reflected by the one micro-lens not corresponding to the one opening and absorbed by the light absorbing layer 142a. Third light L3 that does not travel to the openings OPN may be reflected by the light reflecting layer 142b and may be reused.

In an exemplary embodiment, the backlight unit 150 has a half-power angle of about 15 degrees to about 25 degrees and the display apparatus 100 employs a collimated light source as the backlight unit 150 such that the cross-talk phenomenon is effectively prevented or substantially reduced.

Although the exemplary embodiments of the invention have been described, it is understood that the invention should not be limited to these exemplary embodiments but various changes and modifications may be made by one ordinary skilled in the art within the spirit and scope of the invention as hereinafter claimed.

What is claimed is:

1. A display apparatus comprising:
a display panel including a plurality of pixels to display an image;
a polarizing plate disposed on the display panel; and
a retarder disposed opposite to the display panel,
wherein the polarizing plate is interposed between the retarder and the display panel,
wherein the retarder includes first areas and second areas alternately arranged therein with respect to each row of adjacent pixels defining the plurality of pixels, and
wherein a direction of a slow axis of the retarder having a first phase retardation in the first areas is different from a direction of a slow axis of the retarder in the second areas having a second phase retardation different from the first phase retardation,
wherein the display panel displays the image on a frame-by-frame basis,
a frame includes a first sub-frame and a second sub-frames,
the pixels include first pixels corresponding to a part of the first areas, second pixels corresponding to a remaining part of the first areas, third pixels corresponding to a part of the second areas, fourth pixels corresponding to a remaining part of the second areas,
wherein the display panel comprises:
a first substrate;
a second substrate disposed opposite to the first substrate; and
a liquid crystal layer disposed between the first substrate and the second substrate,
wherein each of the pixels comprises:
a gate line extending in a first direction;
a data line extending in a second direction crossing the first direction;
a switching device including a gate electrode branched from the gate line, a source electrode branched from the data line, and a drain electrode spaced apart from the source electrode;
a pixel electrode connected to the drain electrode; and
a common electrode which generates an electric field with the pixel electrode to represent a gray scale,
wherein the liquid crystal layer includes a dielectric material.

2. The display apparatus of claim 1, wherein
the first pixels are applied with a data voltage corresponding to a predetermined gray scale during the first sub-frame of the frame,
the second to fourth pixels are applied with a data voltage corresponding to a black gray scale during the first sub-frame of the frame,
the second pixels are applied with a data voltage corresponding to a predetermined gray scale during the second sub-frame of the frame,
the first, third and fourth pixels are applied with a data voltage corresponding to the black gray scale during the second sub-frame of the frame,
the third pixels are applied with a data voltage corresponding to a predetermined gray scale during the first sub-frame of the next frame,
the first, second and fourth pixels are applied with a data voltage corresponding to the black gray scale during the first sub-frame of the next frame,
the fourth pixels are applied with a data voltage corresponding to a predetermined gray scale during the second sub-frame of the next frame, and
the first, second and third pixels are applied with a data voltage corresponding to the black gray scale during the second sub-frame of the next frame.

3. The display apparatus of claim 1, wherein
the pixels are arranged substantially in a matrix form having first to n-th rows, wherein n is a natural number greater than or equal to 6,
the first areas correspond to the pixels arranged in odd-numbered rows of the first to n-th rows, and
the second areas correspond to the pixels arranged in even-numbered rows of the first to n-th rows.

4. The display apparatus of claim 3, wherein
the first pixels are arranged in a (6i+1)-th row and a (6i+3)-th row,
the second pixels are arranged in a (6i+5)-th row,
the third pixels are arranged in a (6i+2)-th row and a (6i+4)-th row,
the fourth pixels are arranged in a (6i+6)-th row, and
i is a constant number greater than or equal to zero (0).

5. The display apparatus of claim 1, wherein
pixel electrodes of the first pixels are applied with a data voltage corresponding to a predetermined gray scale during the first sub-frame of the frame,
pixel electrodes of the second to fourth pixels are applied with a data voltage corresponding to a black gray scale during the first sub-frame of the frame,
pixel electrodes of the second pixels are applied with a data voltage corresponding to a predetermined gray scale during the second sub-frame of the frame,
pixel electrodes of the first, third and fourth pixels are applied with a data voltage corresponding to the black gray scale during the second sub-frame of the frame,
pixel electrodes of the third pixels are applied with a data voltage corresponding to a predetermined gray scale during the first sub-frame of the next frame, pixel electrodes of the first, second and fourth pixels are applied with a data voltage corresponding to the black gray scale during the first sub-frame of the next frame, pixel electrodes of the fourth pixels are applied with a data voltage corresponding to a predetermined gray scale during the second sub-frame of the next frame, and pixel electrodes of the first, second and third pixels are applied with a data voltage corresponding to the black gray scale during the second sub-frame of the next frame.

6. The display apparatus of claim 1, further comprising:

a backlight unit disposed opposite to the retarder, wherein the display panel is interposed between the retarder and the backlight unit, and wherein the backlight unit emits light to the display panel.

7. The display apparatus of claim 6, wherein the backlight unit comprises:

a light source which emits the light;

a base film disposed on the light source, wherein the base film receives the light from the light source and provides the light to the display panel; and a plurality of micro-lenses disposed between the display panel and the base film.

8. The display apparatus of claim 7, further comprising:

a plurality of optical patterns disposed on the base film facing the micro-lenses and disposed between two adjacent micro-lenses when viewed in a plan view.

9. The display apparatus of claim 1, wherein each of the sub-frames has a time period of about 1/120 second.

10. The display apparatus of claim 1, wherein the pixels include first pixels corresponding to the first areas and second pixels disposed corresponding to the second areas, and the first pixels and the second pixels are alternately arranged on the display panel.

11. The display apparatus of claim 10, wherein pixel electrodes of the first pixels are applied with a data voltage corresponding to a predetermined gray scale in a frame during which the first pixels are driven, pixel electrodes of the second pixels are applied with a data voltage corresponding to a black gray scale in the frame during which the first pixels are driven, the pixel electrodes of the first pixels are applied with a data voltage corresponding to the black gray scale in a frame during which the second pixels are driven, and the pixel electrodes of the second pixels are applied with a data voltage corresponding to a predetermined gray scale in the frame during which the second pixels are driven.

12. The display apparatus of claim 10, wherein a gate-on voltage is sequentially applied to gate electrodes of the first pixels in the frame during which the first pixels are driven, a gate-off voltage is applied to gate electrodes of the second pixels in the frame during which the first pixels are driven, the gate-off voltage is applied to the gate electrode of the first pixels in the frame during which the second pixels are driven, and the gate-on voltage is sequentially applied to the gate electrodes of the first pixels in the frame during which the second pixels are driven.

13. The display apparatus of claim 1, further comprising:

a backlight unit disposed opposite to the retarder, wherein the display panel is interposed between the retarder and the backlight unit, and wherein the backlight unit emits light and has a half-power angle in a range from about 15 degrees to about 25 degrees.

14. The display apparatus of claim 13, wherein the backlight unit comprises:

a light source which emits the light;

a base film disposed on the light source, wherein the base film receives the light and provides the light to the display panel; and a plurality of micro-lenses disposed between the display panel and the base film.

15. The display apparatus of claim 14, further comprising:

a plurality of optical patterns disposed on the base film facing the micro-lenses and disposed between two adjacent micro-lenses when viewed in a plan view.

16. The display apparatus of claim 1, wherein the first slow axis is substantially parallel to a first direction in the first area and the second slow axis is substantially parallel to a second direction in the second area, the second direction crossing the first direction.

* * * * *